United States Patent
He et al.

(10) Patent No.: US 7,726,572 B2
(45) Date of Patent: Jun. 1, 2010

(54) BAR CODE SCANNING DECODING

(75) Inventors: Duanfeng He, South Setauket, NY (US); Eugene Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1098 days.

(21) Appl. No.: 11/292,926

(22) Filed: Dec. 2, 2005

(65) Prior Publication Data

US 2006/0118633 A1 Jun. 8, 2006

Related U.S. Application Data

(63) Continuation-in-part of application No. 11/032,767, filed on Jan. 10, 2005, now Pat. No. 7,337,970.

(60) Provisional application No. 60/633,073, filed on Dec. 3, 2004.

(51) Int. Cl.
*G06K 7/10* (2006.01)

(52) U.S. Cl. .............. 235/462.1; 235/462.01; 235/462.12

(58) Field of Classification Search ........... 235/462.01, 235/462.09, 462.1, 462.11, 462.24, 462.25, 235/454; 382/170
See application file for complete search history.

(56) References Cited

U.S. PATENT DOCUMENTS

| | | | |
|---|---|---|---|
| 4,794,600 A | 12/1988 | Lin | |
| 5,519,436 A | 5/1996 | Munson | |
| 5,933,249 A | 8/1999 | Shimura et al. | |
| 6,047,893 A * | 4/2000 | Saporetti | 235/462.1 |
| 6,076,738 A | 6/2000 | Bloomberg et al. | |
| 6,223,988 B1 | 5/2001 | Batterman et al. | |
| 6,283,374 B1 | 9/2001 | Fantone et al. | |
| 6,429,934 B1 | 8/2002 | Dunn et al. | |
| 6,508,404 B2 | 1/2003 | Hecht | |
| 6,661,521 B1 | 12/2003 | Stern | |
| 6,895,116 B2 | 5/2005 | Yen et al. | |

OTHER PUBLICATIONS

"TSC Meeting Minutes." Jan. 13, 2005.
"Minutes for Ad Hoc Work Group Meeting on Direct Marked Symbol Reading". Apr. 4, 2005.
"TSC Meeting Minutes". Apr. 5, 2005.
"AIM DPM Quality Guideline". Jul. 15, 2005.
2 pg Form PCT/ISA/210 PCT Int'l Search Report of Int'l App No. PCT/US05/43940; filed Dec. 2, 2005.
International Preliminary Report on Patentability dated Jun. 14, 2007 in related case PCT/US2005/043940.
Office Action dated Mar. 10, 2010 in related China Patent Application 200580041394.4.

* cited by examiner

*Primary Examiner*—Seung H Lee

(57) ABSTRACT

A two dimensional symbol is decoded by forming a binary image that includes the symbol. The binary is used to generate symbol margins for use in digitization. By using the binary image to determine the symbol margins, margins can be located efficiently and in the presence of symbol contrast variation caused by irregularities in the marked surface or light source angles. Digitization proceeds based on the determined margins.

51 Claims, 5 Drawing Sheets

BAR CODE SCANNING DECODING

CROSS REFERENCE TO RELATED APPLICATIONS

This application is a continuation-in-part of U.S. patent application Ser. No. 11/032,767 filed Jan. 10, 2005 which claims the benefit of priority from U.S. Provisional Patent Application Ser. No. 60/633,073 filed Dec. 3, 2004.

TECHNICAL FIELD

The invention relates generally to the field of bar code scanners and more particularly to bar code scanners adapted for use with direct part marking.

BACKGROUND OF THE INVENTION

The use of two dimensional bar codes, which consist of generally rectangular codes with data laid out in an array fashion, has become increasingly popular. Two dimensional bar codes are advantageous because they can hold binary as well as alphanumeric data, and usually include an error correction function. In addition, a two dimensional bar code is significantly more efficient than a traditional one dimensional bar code, being able to store much more information in a smaller space.

DataMatrix is an industry standard two dimensional bar code convention that includes both error detection and correction. Each DataMatrix symbol consists of data regions that contain nominally square modules set out in a rectangular array. A dark module is a binary 1 and a light module is a binary 0. There is no specified minimum or maximum for the X or Y dimension. The data region is surrounded by a finder pattern, a perimeter to the data region that is one module wide, that is surrounded by a quite zone on all four sides of the symbol. Two adjacent sides are solid dark lines used primarily to define physical size, orientation, and symbol distortion. The two opposite sides consist of alternating dark and light modules. These are used primarily to define the cell structure but also assist in determining physical size and distortion. One popular form of DataMatrix symbology is known as ECC 200, which uses Reed-Solomon error correction.

The compact size of the DataMatrix symbols makes them ideal for use in direct part marking. In direct part marking, the DataMatrix symbols are imprinted directly on parts being marked as opposed to being imprinted on labels that are applied to the part. Direct part marking presents challenges caused by the fact that the DataMatrix symbols may not necessarily be imprinted upon a perfectly flat surface or upon a surface with uniform reflectivity properties. In addition, the data modules may be imprinted as circular dots instead of square modules, such as in the case where metallic parts are marked by dot-peening the parts

SUMMARY

A symbol is decoded from an input gray scale image by forming a binarized version of the image that is used to generate symbol margins for use in digitization. The binarized version of the gray scale image can be formed locally and on-demand by collecting information about pixels located at the boundary of the symbol and binarizing based on the collected information. By using a binarized version of the gray scale image to determine the symbol margins, margins can be located efficiently and in the presence of symbol contrast variation caused by irregularities in the marked surface or illumination variation across the surface.

An outline of a symbol, such as a bar code symbol, is determined using a binary image. The image is then digitized based on the outline, which is made up of pixels that have a known state.

In the described embodiment, the contour of the boundary of the symbol is traversed. A threshold surface is formed that is a function of characteristics of the local pixels located at the boundary of the symbol. The grey scale image is binarized using the threshold surface to arrive at a binary image that is used to determine the outline of the bar code symbol. Groups of adjacent foreground pixels in the binary image are traversed to locate margin lines of the bar code symbol, and optionally the traversal can include jumps of a given number of pixels. Alternatively, groups of adjacent foreground pixels in the binary image may be merged and an outline of the merged adjacent pixels is traversed to find margin lines of the bar code symbol. The margin lines are aligned by shifting each margin line until it intersects the bar code and pivoting the margin line about the point of intersection until it is parallel to a bar code boundary. At least one fat line is drawn orthogonal to a bar code boundary and traversed to determine a first significant edge.

A periodicity of the bar code symbol is determined by analyzing a strip of the bar code at each of four margin lines that make up the outline and determining a periodicity of modules of each of the four margin lines. A grid is constructed having grid spacings corresponding to the periodicities of modules determined by an analysis of the four margin lines. The grid is populated with tiles each including a set of adjacent modules in the bar code symbol and each module in a tile that has an unknown state is assigned a state by an analysis based on comparisons with modules in the tile with known states. The process for determining the state of modules in the tile may begin with initial tiles along the margins which contain known modules determined during the analysis of the four margin lines.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
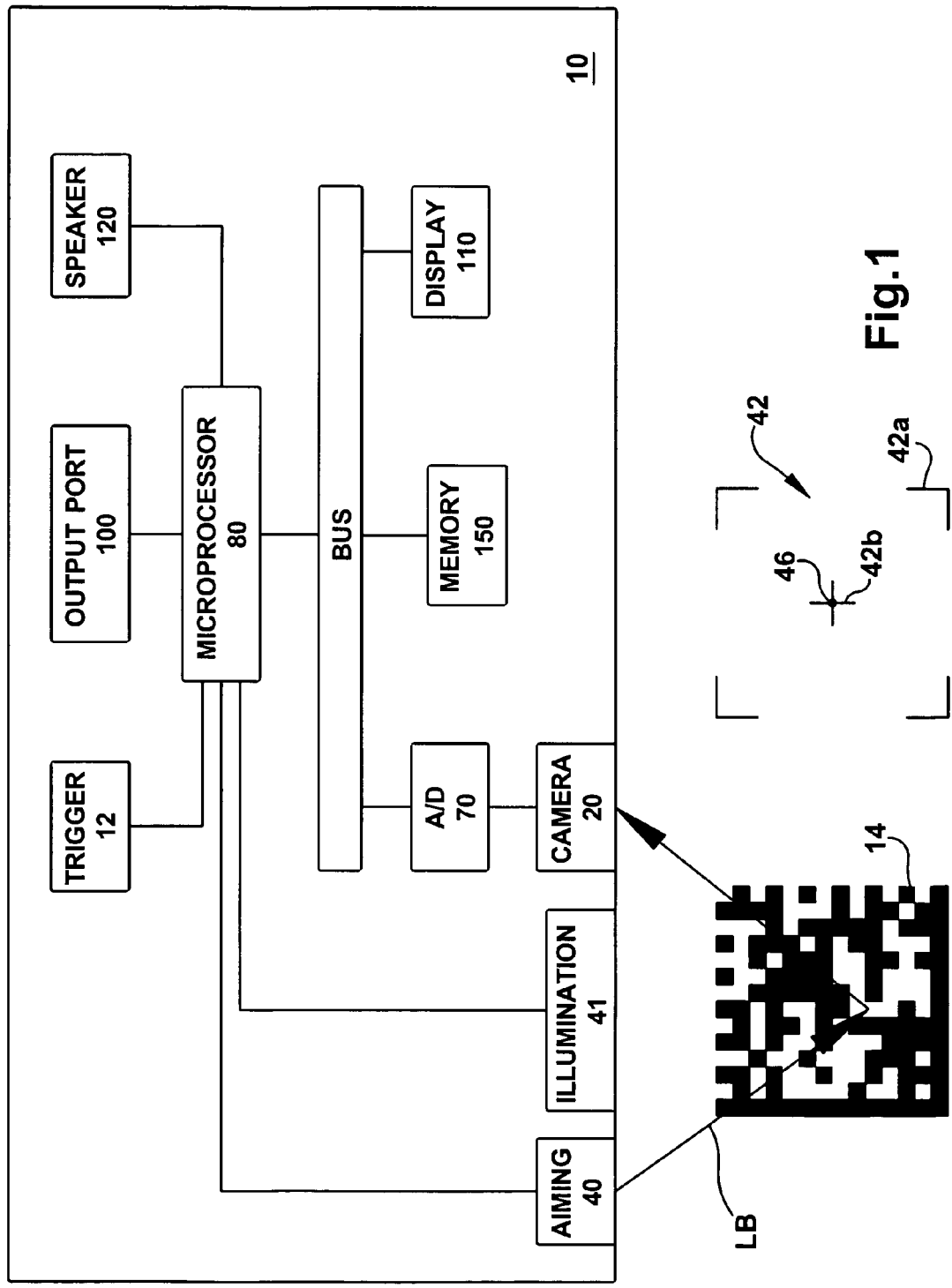
FIG. 1 is a schematic block diagram of an imaging-based direct part marking scanner having a decoding system constructed according to one embodiment of the present invention.

An imaging-based direct part marking scanner is shown schematically at 10 in FIG. 1. The scanner 10, in addition to imaging and decoding both one dimensional and two dimensional bar code symbols, is also capable of capturing images and signatures. In one preferred embodiment of the present invention, the scanner 10 is a hand held portable reader that can be carried and used by a user walking or riding through a store, warehouse or plant for reading bar codes for stocking and inventory control purposes.

However, it should be recognized that the direct part marking decoding system of the present invention, to be explained below, may be advantageously used in connection with any type of imaging-based automatic scanner. In addition, for the purposes of this description, a DataMatrix image is the target of the scanner, however any direct part marking convention can be advantageously decoded by the decoding system of the present invention.

The scanner 10 includes a trigger 12 coupled to a direct part marking microprocessor 80 that includes scanner circuitry for initiating reading of a target DataMatrix symbol 14 that is directly marked on a product (not shown) when the trigger 12 is pulled or pressed. The scanner 10 includes a camera 20 including a focusing lens and a CCD imager, and an illumination source 41 that directs light onto the target. The focusing lens focuses light that is reflected from the target DataMatrix symbol 14 onto an array of photosensors or pixels of the CCD imager. At predetermined intervals, the pixels of pixel array are read out generating an analog signal representative of an image of whatever is focused by the lens on the pixel array, for example, an image of the DataMatrix symbol 14. The analog image signal from the camera is then digitized to a gray scale version by an analog-to-digital converter 70 and the gray scale image is stored in memory 150. The stored gray scale image is decoded by the microprocessor 80 using stored programs steps adapted for decoding direct part marking DataMatrix symbols. Decoded data, representative of the data/information coded in the DataMatrix symbol 14 is then output via a data output port 100 and/or displayed to a user of the scanner 10 via a display 110. Upon achieving a good "read" of the DataMatrix symbol 14, a speaker 120 is activated by the microprocessor to indicate to the user that the bar code has been successfully read. Simultaneously, one or more indicator lights, not shown in FIG. 1, may be activated to provide an additional indication that a read is successful.

The DataMatrix symbol scanner 10 further includes an aiming system 40 for generating a visible aiming pattern 42 to aid the user in properly aiming the reader at the target DataMatrix symbol 14. In one preferred embodiment, the aiming system 40 includes a laser diode array and lens. Alternatively, the aiming apparatus 40 may utilize an LED or another source of illumination known to those of skill in the art. The pattern 42 may be a pattern comprising a plurality of rectangular brackets 42a that surround a central "cross hair" pattern 42b that is aligned with a single dot 46 as shown in FIG. 1. The aiming pattern may be generated by a diffractive optical element, not shown, that is assembled adjacent to or within the lens.

Figure 2:
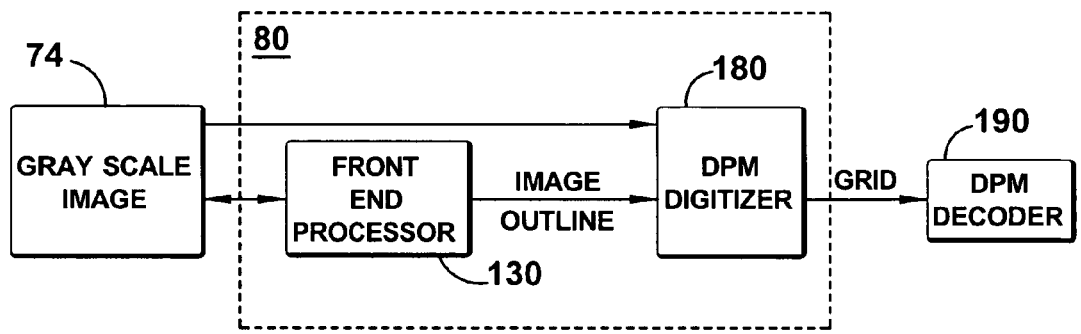
FIG. 2 is a schematic block diagram of the decoding system of FIG. 1.

FIG. 2 is a block diagram of the various functional program modules stored in the microprocessor 80 that decode a gray scale image 74 of a DataMatrix symbol. The modules include a front end processor 130 and a direct part marking ("DPM") digitizer 180 that contain stored programming steps for analyzing DataMatrix images scanned from a directly marked part. The front end processor 130 generates an outline of the scanned DataMatrix symbol, which is input to the DPM digitizer 180. The DPM digitizer uses the outline and the original gray scale DataMatrix image to differentiate between dark and light modules in the DataMatrix image for decoding by a decoder 190.

Front End Processing to Find Symbol Outline

Figure 3:
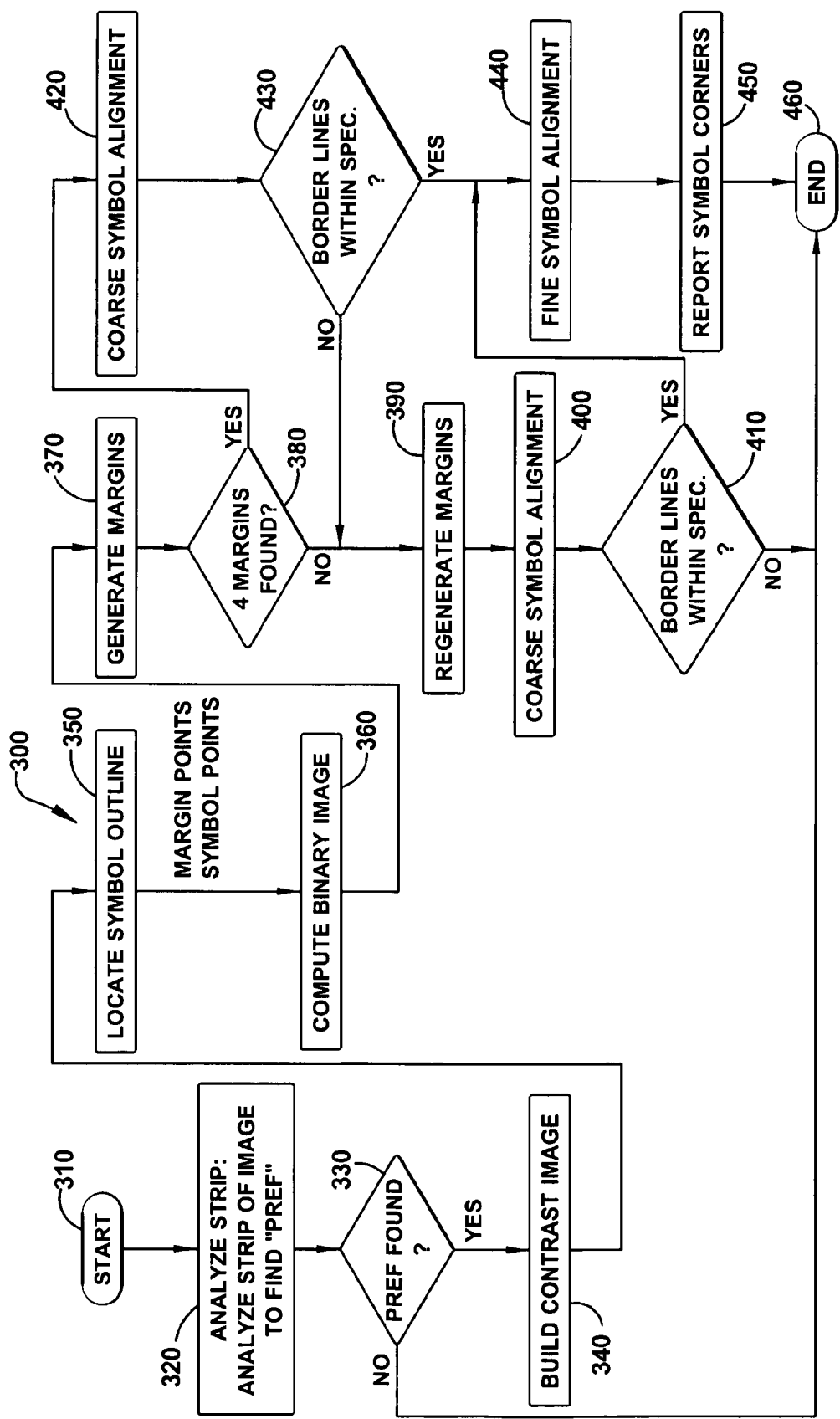
FIG. 3 is a flowchart that outlines an exemplary method used by the front end processor of FIG. 2 to process symbols according to an embodiment of the present invention.

FIGS. 3 and 4 illustrate one method that can be used by the front end processor to generate an outline for a scanned DataMatrix symbol. The front end processor generates a quadrilateral that corresponds to the outline of the DataMatrix symbol. The outline is defined as the pixels immediately outside the area occupied by the symbol. Therefore, "shadows" outside of the approximately round shapes of dots are not included as part of the symbol.

Referring now to FIG. 3, the method of operation for the front end processor 300 is outlined in flow chart form. A gray scale DataMatrix symbol image (see FIG. 4A) is input to the front end processor. In 320, a strip of the image is searched to locate a point, called "pref" for the purposes of this description, that is within the DataMatrix symbol. Processing time is saved by analyzing a strip of the image rather than the entire image. The strip that is analyzed is at the locus of the aiming cross-hair, with it being assumed that an operator will aim directly at the symbol. The analysis performed in 320 returns the single pixel location that is most likely to be in the symbol and an initial estimate of the level of noise in the neighborhood of the symbol. If no likely pixel is found, the method ends at 330 and 460.

Due to the three dimensional nature of many DPM DataMatrix symbols and possible curvature of the marked surface, "dots" or filled/printed modules of the DataMatrix symbol may appear "light" in one area of the symbol and "dark" in another area. To reduce the complexity of the originally digitized image, the front end processor builds a contrast version of the original image at 340 that is used solely for the purpose of finding the outline of the DataMatrix symbol. From the located point, "pref," a contrast image is built like that shown in FIG. 4B. The starting point for the construction of the contrast image is the point "pref" from the strip analysis. The contrast image is formed by analyzing one block of the image at a time and converting only adjacent blocks with significant contrast so that only the "neighborhood" of each symbol is converted, saving on execution time. The order in which pixels are visited is controlled by a depth-first search algorithm that starts with the point "pref." The conversion takes a square of four adjacent pixels of the input image and outputs a single pixel whose value is the difference between the brightest and darkest of the four input pixels, which gives an indication of local contrast.

Once the contrast image is built, the contrast image is analyzed at 350 to locate the "quite zone" outline that surrounds a DataMatrix symbol. The quiet zone is located by performing a center-out type finding routine. Starting at the point "pref" a number of fat lines are drawn radially outwards towards the margin. In this case, a fat line is the line profile generated when a statistical operator, for example SUM or MAX, is applied to the projection of pixels across adjacent lines. The line profile generated uses the MAX function to "cover over" holes that naturally occur in the interior of the symbol. The lines are evenly spaced at about 22.5 degrees. The algorithm walks from the seed point "pref" along the lines until a quiet zone is found. For each line, a point in the quiet zone and the last point on the symbol are recorded. Thus two sets of points representing the background or "unfilled" modules, as can be seen dispersed outside the symbol in FIG. 4F, and the foreground or "filled" modules are available for later processing. The background set of points is called the star or margin points.

At 360 a binary image (FIG. 4C) is formed from the contrast image. Binarization is an effective method for suppressing noise and algorithms for processing binary images are very efficient. While binary images tend to cause a reduction in the accuracy of edge locations when compared to processing gray scale images directly, this loss of accuracy is acceptable when the binary image is used only to locate margin lines within the quiet zone that encircles a DataMatrix symbol. The described embodiment therefore leverages the efficiencies of processing a binary image while avoiding relying on the binary image to pinpoint precise edge locations. A threshold surface or plane that is to be used to discern "filled" from "unfilled" modules for the binary image is computed by averaging planes formed by each of the two sets of points output in 350. The binary image assigns the color black (foreground) to any pixel of the contrast image that is above the threshold plane and white (background) to pixels below the threshold plane. This binarization process is advantageously applied only to the rectangular sub-region of the contrast image that just contains all the margin points, i.e. the bounding box of the margin points. The resulting cropped binary image is only slightly larger than the DataMatrix symbol and ensures that the symbol, and not the surrounding region, is the focus of further analysis steps.

Figure 4C:
FIGS. 4A-4F are images that are acted upon during practice of the method of FIG. 3.
Figure 4F:
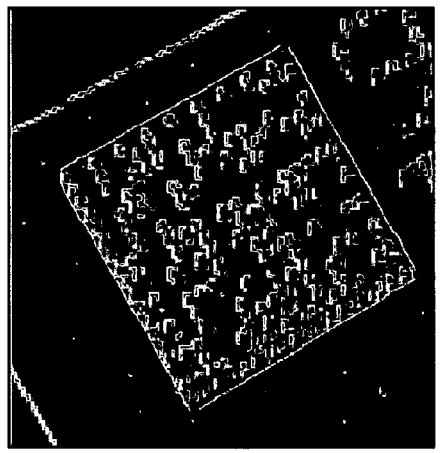
Figure 4B:
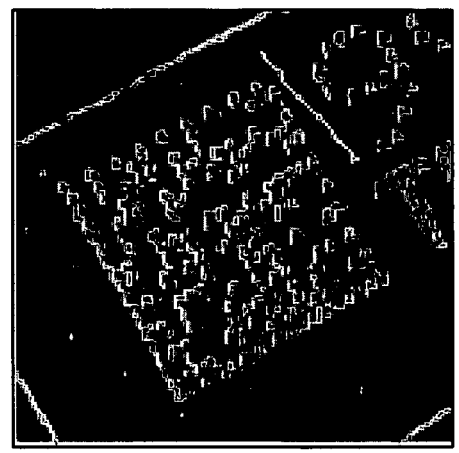

At 370, an initial set of margins is generated by connecting consecutive quiet zone or margin points to produce margin lines, which can be seen as the outer discontinuous outline on the top and sides of the symbol in FIG. 4B. An attempt is made to draw "background" lines between margin points, skipping points if necessary. A background line is one where 95% of its profile is below the threshold plane. The result is usually a partial outline, such as the jagged lines around the top and sides of the symbol in FIG. 4B, but may be a set of disconnected lines or no lines at all. Adjacent margin lines are merged to yield the minimum number of margin lines required to encircle the symbol as shown by the bright white lines around the top and sides of the symbol in FIG. 4D. Ideally, four margin lines are found, giving a coarse indication of the orientation of the symbol. New margin points can be created based on the geometry of existing lines to improve the quality of the outline.

Figure 4E:
Figure 4A:
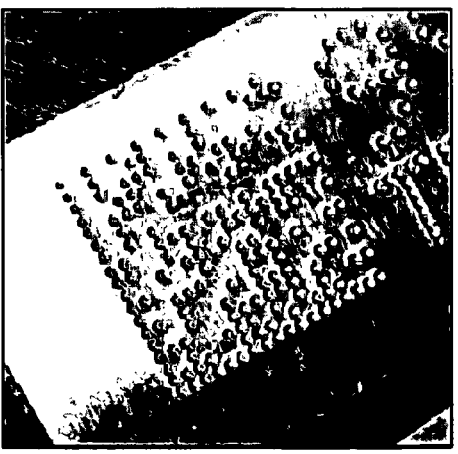

At 380, the margin lines are checked and if exactly four lines have not been found, attempts are made to regenerate the margins at 390. Two methods for regenerating margins are tried, based on the assumption that adjacent filled/foreground pixels of the binary image form a number of "blobs" that contain the characteristic "L" of a DataMatrix symbol. First, if there is one or less margin lines from 370, as may occur with very noisy images, the blob closest to the point "pref" is identified. A contour walker traverses the blob to recover the outline, jumping over holes of one of two specified numbers of pixels. The contour, which can be seen as the grey lines in FIG. 4E, is searched to locate the characteristic "L" of a DataMatrix symbol, which can be passed to another routine that completes the square/rectangular outline. The second regeneration routine requires at least two optimized margin lines, such as the "L" found above. The longest optimized margin line is used to estimate the symbol orientation Two approximately orthogonal fat lines, one aligned to the symbol, are drawn through the seed point in an attempt to find four new margin points. These points occur on the foreground side of the foreground/background border. The new margin points are used to seed the contour walker four times. The contour that yields the largest "L" is selected and four optimized margin lines extracted from this contour. These four optimized margin lines are input to 400 or 420, in which a coarse symbol alignment is performed.

The contour walker finds the boundary of a blob formed by adjacent foreground pixels in a binarized DataMatrix image. Because the DataMatrix symbol is often fragmented into multiple blobs, the contour walker is allowed jumps to bridge disconnected blobs. The maximum jump step size can be selected from 2 to 4 pixels. In addition the contour walker can be called successively for the same image using different jump sizes. The contour walker starts with a seed point on the blob whose contour is to be traced. The seed point does not need to be on the edge of the blob. The routine always walks the outside contour in a clockwise direction. A "loop buster" feature ensures that the contour walker, because of its designed feature to jump gaps, does not end up in a counter-clockwise dead loop. The contour walker outputs a marked bitmap as shown in FIG. 4E and the coordinates of the topmost, bottom-most, left-most and right-most points in the contour. An alternative to the contour walker that jumps holes is to bridge or fill in the holes between blobs by using a region growing or dilation technique. A regular contour walker can then define the outline of the merged blobs. This approach produces similar results to the "jumping" contour walker but may be slower.

Figure 4D:
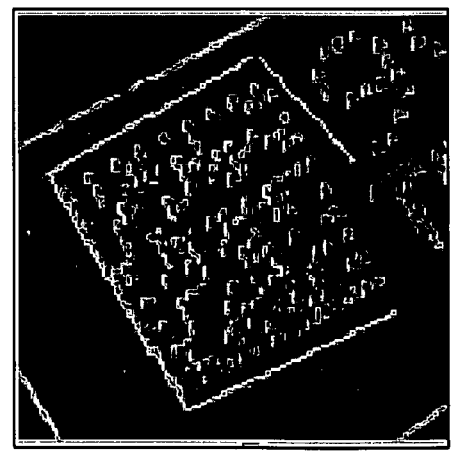

Four optimized margin lines, shown as the bright white lines in FIG. 4D and the binary image are input at 400 or 420 to find a coarse alignment of the outline of the symbol. As can be seen in FIG. 3, the coarse edge alignment may be performed on four margin lines that were generated at 370 or regenerated at 390. Each margin line is shifted from its starting position towards the seed point until it cuts the symbol. The point at which the margin cuts the symbol is defined as a pivot point about which the line is rotated until it is parallel to the symbol boundary. Because this alignment is done on the binary image, it is a coarse alignment and is shown as the light gray outline in FIG. 4F. At 410 or 430, the coarsely aligned border lines are checked to determine if they make sense, such as, for example, by checking the angle between opposite lines to verify that it is small or determining that the aspect ratio of the code outline is not highly skewed. If the coarsely aligned border lines are within acceptable limits, a fine symbol alignment is performed on the original gray scale image.

To perform the fine symbol alignment 440 on the gray scale image, two fat lines are drawn orthogonal to the edge of each side of the symbol. The lines are drawn from outside to inside of the symbol, crossing the symbol border. A SUM function is used to generate the profile of each fat line. The profile is examiner from outside to inside of the symbol, to find the first significant edge. This produces two points on the boundary of the symbol, one at either end, and precisely defines the symbol border as shown in the bright white lines in FIG. 4F and reported at 450.

Figure 6:
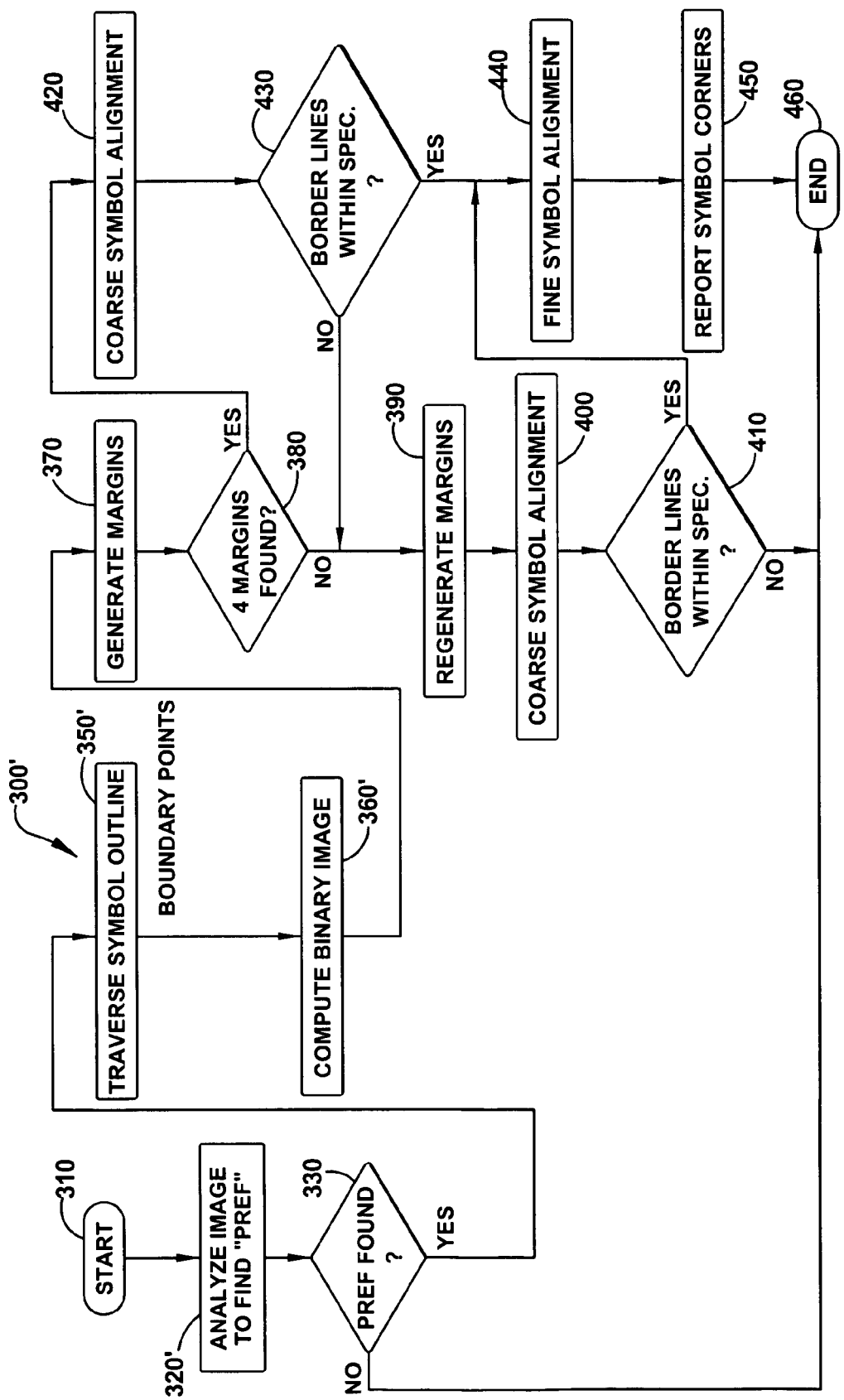
FIG. 6 a flowchart that outlines an exemplary method used by the front end processor of FIG. 2 to process symbols according to an embodiment of the present invention.

FIG. 6 illustrates a front end processing method 300' that acts on the gray scale image to determine an outline of the target symbol for digitization. According to the method 300' a contour or boundary of the symbol is traversed to gather boundary pixel information that is used to binarize the gray scale image at 360. At 320 the gray scale image is analyzed to find a reference or seed point, "PREF." The point PREF is selected as a point that is most likely within the symbol. Many techniques can be used to find PREF. For example, PREF can be selected as a point at which the user is directing the imaging scanner or scanning the image and noting points where local statistics are significant and correlated. If an acceptable PREF cannot be found at 330, the method ends.

At 350', the outline of the symbol is traversed using a contour walker, such as the contour walker described above in reference to step 380. Acting on the gray scale image, the contour walker starts at PREF and follows a path of pixels that radiates from PREF until the background of the symbol is encountered. The contour walker traverses the outline of the gray scale image based on the assumption that adjacent filled/foreground pixels of the gray scale image form a number of blobs that represent the outline of the symbol. A contour of the symbol is thus constructed and at the same time information about pixels at the boundary of the symbol as a function of the pixel's position in the image is collected. This pixel information, which can be for example a level of contrast of the pixel with respect to surrounding pixels or statistical information about the pixel is used to compute the binary image at 360'. From this point on, the method 300' progresses as described above through 450 in which symbol corners are reported for digitization.

DPM Digitizer

Figure 5:
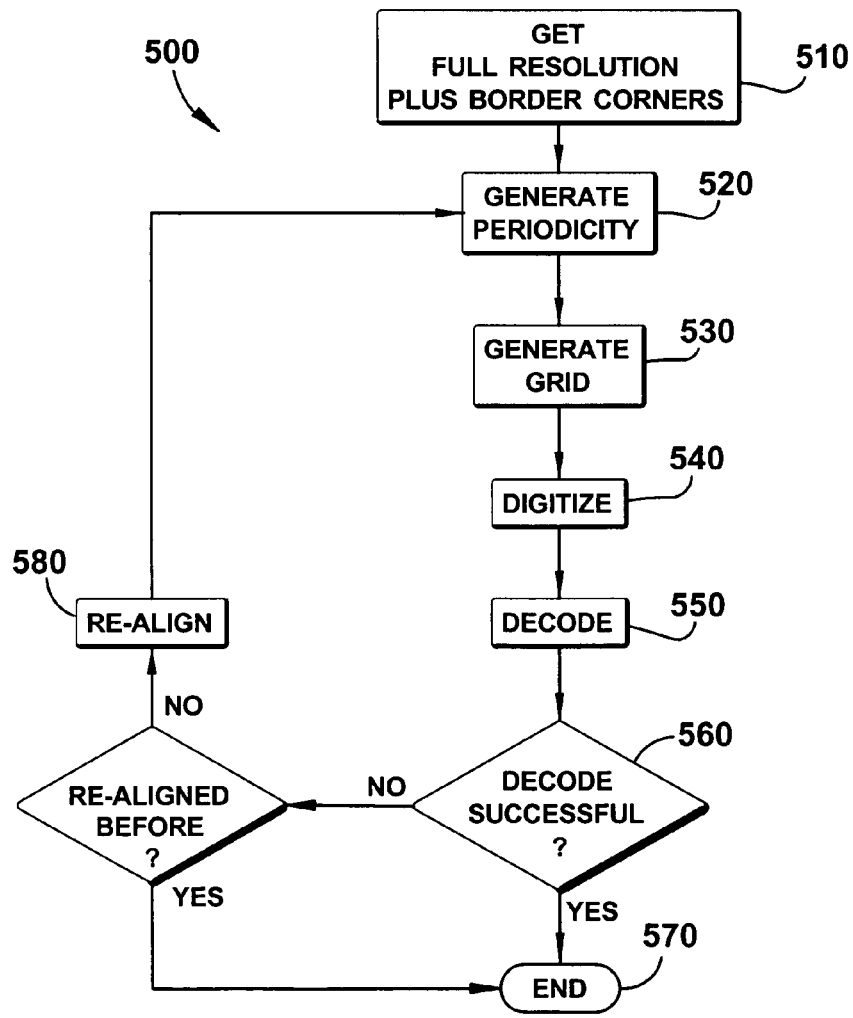
FIG. 5 is a flowchart outlining an exemplary method used by the DPM digitizer of FIG. 2.

The DPM digitizer 180 (FIG. 2) is adapted to process dotted DataMatrix symbols in which each marked module of the symbol is formed as a distinct dot. However, the digitizer can still deal with DataMatrix printed in the normal form, with generally square, and connected, symbol modules. FIG. 5 is a flowchart illustration of one method 500 that can be used by the DPM digitizer and DPM decoder (FIG. 2) to decode the gray scale image 74 using the image outline provided by the front end processor 130 which are input at 510.

The first step to decoding the symbol is to determine the periodicity of the modules in the symbol. The periodicity may vary as a function of position in the symbol due to irregularities in the imprinted surface or a pronounced scan angle. At 520 the periodicity of the symbol modules is determined along each side of the symbol, using the outline derived by the front-end processor. The periodicity analysis is performed in two passes, namely a rough analysis pass and a fine analysis pass, both performed on the gray scale image. In the rough analysis a fixed width strip is analyze to find indications of the periodicities. The analysis can be performed using either an auto-correlation method or a fast Fourier Transform, or any other known method for periodicity extraction. The periodicities thus derived from the four sides are consolidated to arrive at two numbers, which represent the widths of an anchor swath of pixels that cover the first rows of modules along each side of the outline, one for each pair of opposite sides. Periodicity analysis may not be successful on all sides. For example, if a side is made of a solid line, its periodicity cannot be found.

In the fine periodicity analysis the widths of the anchor swaths derived in the first pass are used to scan for anchors along each side of the outline. The samples are separated into three categories (black, white, and background) via two thresholds. All anchors along a single line are chosen from the same colored blobs. Each anchor is also given an index, to account for skipped (either damaged or undetected) anchor points. Not all sides would be able to produce anchors. For known solid sides of the DataMatrix that are not formed with individual dots, this step is bypassed.

Although only one color is used for anchors along each side, this does not exclude proper treatment for image contrast reversal. This is because the different sides do allow for different colored anchors. When forming a grid, two neighboring sides with different colored anchors produce a gradual shift of the phase of the anchors.

At 530 a grid is generated using the periodicity that was determined at 520. In addition to generating a grid, at 530 heuristic attempts are made to make sense of the possibly inconsistent periodicity analysis results from the four sides. The possibilities determined by the heuristics are matched against legal code sizes for DataMatrix. Results of the heuristics include an indication of which sides are dotted, which are solid, and also imply which corner is the starting corner of the DataMatrix symbol, or the top-left corner in the orientation in which the symbol is generated, and the grid size in terms of number of rows and columns.

Once the starting corner and grid size are determined, the grid is generated using the four intersection points of the centerlines of outermost rows of modules. Each of the centerlines could be that of a row of anchors, or derived from a solid-edge alignment routine. When not all four intersection points can be resolved, the grid is generated using the know anchors. This occurs, for example, when anchors are only found on two of the four sides.

At 540, the grid is digitized using one of two values, representing the presence or absence of a print mark, corresponding to each of the modules of the DataMatrix symbol. The digitization is performed a tile at a time, with each tile comprising a 5×5 set of modules. The digitization starts from tiles at corners, and moves on to tiles along the edges. When a complete ring of tiles is digitized the next layer inward is digitized, with tiles from subsequent rings slightly overlapping each for bootstrapping. This process is repeated until there are either no more modules to be digitized, or one tile cannot be digitized due to conflicting input conditions. This process ensures that only local module definition is used to determine the input condition of a given tile because local module definition can shift to accommodate image contrast reversal within the symbol.

The state of any unknown module in a tile is determined based on the states of known modules in the tile. Initially the known modules are those modules which are known to be dots, or non-dots, based on the predictions of the chosen DataMatrix size when the digitization is just started. Later, when the process is working on inner tiles, the known modules are from previously digitized tiles. A matched filter is produced next based on the input modules. For each input module, the same number of pixels is sampled. The pixels from the same relative location within the different modules are analyzed, in search of those that present statistical significance in separating dots from non-dots. This matched filter is then applied to all unknown modules, and the Otsu thresholding algorithm is used to separate dots from non-dots.

Because a DataMatrix symbol may not be neatly separated into a number of tiles, some modules may be digitized more than once, each time within the context of a different tile. Any modules having different digitization results from different tiles are marked as erasures for decoding DataMatrix. In 550 the decoder is called three times, once with the erasures mapped to erasures proper, once to dots, and once to non-dots. If none of these attempts results in a successful decode and the symbol has not yet been realigned (575), the symbol is realigned at 580 and the digitization begins again.

To re-align a symbol that failed to decode using the outline generated by the front-end processor, the original gray scale image is accessed to attempt to determine a proper outline. The re-alignment utilizes the width of the modules that is determined in the rough pass periodicity analysis. In the case of dotted sides, each side is broken into four equal length segments and the center of each segment is sought by calculating the standard deviation of several parallel positions. When putting together the four resultant points to form a least-squared line, an outlier is checked for and excluded when found. In the case of solid sides, the midpoint of the solid side is checked while making sure that where the width is too wide the midpoint is not considered (this means the edge module may be connected to the next one). The new outline sides are then used in the fine analysis pass of the periodicity generation at 520.

As can be seen from the above description, the described two dimensional symbol digitization system efficiently processes two dimensional symbols imprinted on irregular surfaces by using a binarized version of the gray scale image to determine symbol boundaries and using boundary information to construct the digitized image for decoding. Although the present invention has been described with a degree of particularity, it is the intent that the invention include all modifications and alterations from the disclosed design falling within the spirit or scope of the appended claims.

We claim:

1. A method that decodes a symbol comprising:
   generating a contrast image from a gray scale image;
   transforming the contrast image into a binary image;
   determining an outline of the symbol using the binary image; and
   digitizing the symbol based on the outline and the gray scale image.

2. The method of claim 1 wherein each pixel of the binary image indicates a likelihood that a corresponding group of pixels belongs to the symbol in the contrast image.

3. The method of claim 1 wherein pixels in the binary image are not stored in an electronic memory prior to subsequent processing.

4. The method of claim 3 wherein the pixel values in the binary image are determined when needed for subsequent processing.

5. The method of claim 1 wherein the contrast image is transformed into a binary image by:
   traversing the boundary of the symbol in the contrast image;
   collecting a set of data corresponding to characteristics of pixels located at or near the boundary of the symbol; and
   binarizing the contrast image based on the set of data corresponding to the characteristics of pixels located at or near the boundary of the symbol.

6. The method of claim 5 wherein the boundary of the contrast image is traversed by:
   selecting a seed pixel or group of pixels that forms part of the symbol;
   starting with the seed pixel, traversing a radiating path of pixels until a boundary of the symbol is encountered;
   traversing groups of adjacent pixels having similar binarized representations to locate boundary pixels that form the outline of the symbol.

7. The method of claim 6 wherein the groups of adjacent pixels are binarized as they are traversed to locate boundary pixels.

8. The method of claim 6 wherein the contrast image is binarized by forming a binarization plane that fits the set of data corresponding to the characteristics of boundary pixels.

9. The method of claim 6 comprising merging proximate groups of adjacent foreground pixels in the binary image and traversing an outline of the merged groups adjacent foreground pixels to find margin lines of the symbol.

10. The method of claim 9 wherein the outline of the groups of adjacent foreground pixels is traversed by jumping over spaces of a given number of background pixels between adjacent foreground pixels.

11. The method of claim 9 comprising aligning the margin lines by shifting each margin line until it intersects the symbol and pivoting the margin line about the point of intersection until it is parallel to a symbol boundary.

12. The method of claim 11 comprising drawing at least one fat line that is generated by performing a statistical combination of parallel lines into a single line profile orthogonal to the symbol boundary and determining a first significant edge.

13. The method of claim 12 wherein the symbol is digitized by generating a periodicity of the symbol by analyzing a strip of the symbol at each margin line that makes up the outline and determining a periodicity of modules of each of the four margin lines.

14. The method of claim 13 comprising constructing a grid having grid spacings corresponding to the periodicities of modules of the four margin lines.

15. The method of claim 14 comprising populating the grid with tiles each including a set of adjacent modules in the symbol; and wherein within each tile the states of known modules are used to determine the states of unknown modules.

16. The method of claim 15 wherein the grid is populated first with tiles at the grid corners followed by those at grid edges, and population proceeds generally from the grid edges in a sequence of overlapping rings.

17. The method of claim 1 comprising decoding the digitized symbol.

18. The method of claim 1 wherein the gray scale image is obtained with an imaging bar code scanner.

19. The method of claim 1 wherein the each pixel of the binary image is stored as one byte.

20. The method of claim 1 wherein the each pixel of the binary image is stored as more than one byte.

21. The method of claim 1 wherein the each pixel of the binary image is stored as less than one byte.

22. Computer readable media having computer executable instructions stored thereon for decoding a symbol, the instructions comprising:
    generating a contrast image from a gray scale image;
    transforming the contrast image into a binary image;
    determining an outline of the symbol using the binary image; and
    digitizing the symbol based on the outline and the gray scale image.

23. The computer readable media of claim 22 wherein each pixel of the binary image indicates a likelihood that a corresponding group of pixels belongs to the symbol in the contrast image.

24. The computer readable media of claim 22 wherein pixels in the binary image are not stored in an electronic memory prior to subsequent processing.

25. The computer readable media of claim 24 wherein the pixel values in the binary image are determined when needed for subsequent processing.

26. The computer readable media of claim 22 wherein the instructions for transforming the contrast image into a binary image include:
    traversing the boundary of the symbol in the contrast image;
    collecting a set of data corresponding to characteristics of pixels located at or near the boundary of the symbol; and
    binarizing the contrast image based on the set of data corresponding to the characteristics of pixels located at or near the boundary of the symbol.

27. The computer readable media of claim 26 wherein the instructions for traversing the boundary of the contrast image include:
    selecting a seed pixel or group of pixels that forms part of the symbol;

starting with the seed pixel, traversing a radiating path of pixels until a boundary of the symbol is encountered;

traversing groups of adjacent pixels having similar binarized representations to locate boundary pixels that form the outline of the symbol.

28. The computer readable media of claim 27 wherein the groups of adjacent pixels are binarized as they are traversed to locate boundary pixels.

29. The computer readable media of claim 27 wherein the instructions for binarizing the contrast image include forming a binarization plane that fits the set of data corresponding to the characteristics of boundary pixels.

30. The computer readable media of claim 27 wherein the instructions include merging proximate groups of adjacent foreground pixels in the binary image and traversing an outline of the merged groups adjacent foreground pixels to find margin lines of the symbol.

31. The computer readable media of claim 30 wherein the instructions for traversing the outline of the groups of adjacent foreground pixels include jumping over spaces of a given number of background pixels between adjacent foreground pixels.

32. The computer readable media of claim 31 wherein the instructions include aligning the margin lines by shifting each margin line until it intersects the symbol and pivoting the margin line about the point of intersection until it is parallel to a symbol boundary.

33. The computer readable media of claim 32 wherein the instructions include drawing at least one fat line that is generated by performing a statistical combination of parallel lines into a single line profile orthogonal to the symbol boundary and determining a first significant edge.

34. The computer readable media of claim 33 wherein the instructions for digitizing the symbol include generating a periodicity of the symbol by analyzing a strip of the symbol at each margin line that makes up the outline and determining a periodicity of modules of each of the four margin lines.

35. The computer readable media of claim 34 wherein the instruction include constructing a grid having grid spacings corresponding to the periodicities of modules of the four margin lines.

36. The computer readable media of claim 35 wherein the instructions include populating the grid with tiles each including a set of adjacent modules in the symbol; and wherein within each tile the states of known modules are used to determine the states of unknown modules.

37. The computer readable media of claim 36 wherein the instructions for populating the grid populate the grid first with tiles at the grid corners followed by those at grid edges, and population proceeds generally from the grid edges in a sequence of overlapping rings.

38. The computer readable media of claim 22 wherein the instructions include decoding the digitized symbol.

39. The computer readable media of claim 22 wherein the gray scale image is obtained with an imaging bar code scanner.

40. The computer readable media of claim 22 wherein the each pixel of the binary image is stored as one byte.

41. The computer readable media of claim 22 wherein the each pixel of the binary image is stored as more than one byte.

42. The computer readable media of claim 22 wherein the each pixel of the binary image is stored as less than one byte.

43. An apparatus for decoding a symbol comprising:
means for generating a contrast image from a gray scale image;
means for transforming the contrast image into a binary image;
means for determining an outline of the symbol using the binary image; and
means for digitizing the symbol based on the outline and the gray scale image.

44. The apparatus of claim 43 wherein the means for transforming contrast image into a binary image includes:
means for traversing the boundary of the symbol in the contrast image;
means for collecting a set of data corresponding to characteristics of pixels located at or near the boundary of the symbol; and
means for binarizing the gray scale image based on the set of data corresponding to the characteristics of pixels located at or near the boundary of the symbol.

45. The apparatus of claim 44 wherein the means for traversing the boundary of the grey scale image includes:
means for selecting a seed pixel or group of pixels that forms part of the symbol;
means for traversing a radiating path of pixels until a boundary of the symbol is encountered starting from the seed pixel; and
means for traversing groups of adjacent pixels having similar binarized representations to locate boundary pixels that form the outline of the symbol.

46. The apparatus of claim 45 wherein the means for traversing groups of adjacent pixels binarizes the pixels as they are traversed to locate boundary pixels.

47. An apparatus that decodes a symbol comprising:
a front end processor that transforms the contrast image into a binary image and determines an outline of the symbol using the binary image;
a digitizer that digitizes the symbol based on the outline; and
wherein the front end processor includes a contour walker that traverses the boundary of the contrast image of the bar code and collects a set of data corresponding to characteristics of pixels located at or near the boundary of the bar code and wherein the front end processor binarizes the contrast image based on the set of data corresponding to the characteristics of pixels located at or near the boundary of the bar code.

48. The apparatus of claim 47 wherein the contour walker traverses the boundary of the contrast image by:
selecting a seed pixel or group of pixels that forms part of the symbol;
starting with the seed pixel, traversing a radiating path of pixels until a boundary of the symbol is encountered;
traversing groups of adjacent pixels having similar binarized representations to locate boundary pixels that form the outline of the symbol.

49. The apparatus of claim 48 wherein the contour walker binarizes groups of adjacent pixels as they are traversed to locate boundary pixels.

50. The apparatus of claim 47 comprising a decoder that decodes the digitized symbol.

51. The apparatus of claim 47 comprising an imaging bar code scanner that obtains the gray scale image.

* * * * *